US012208740B2

(12) United States Patent
Ham

(10) Patent No.: US 12,208,740 B2
(45) Date of Patent: Jan. 28, 2025

(54) DEVICE FOR ASSISTING SAFETY EXIT OF VEHICLE AND METHOD THEREFOR

(71) Applicants: Hyundai Motor Company, Seoul (KR); Kia Corporation, Seoul (KR)

(72) Inventor: Jeong Hun Ham, Goyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 182 days.

(21) Appl. No.: 17/983,798

(22) Filed: Nov. 9, 2022

(65) Prior Publication Data

US 2023/0339401 A1 Oct. 26, 2023

(30) Foreign Application Priority Data

Apr. 22, 2022 (KR) .................. 10-2022-0050246

(51) Int. Cl.
*B60R 1/25* (2022.01)
*B60R 1/00* (2022.01)

(52) U.S. Cl.
CPC ............... *B60R 1/25* (2022.01); *B60R 1/007* (2013.01); *B60R 2300/60* (2013.01)

(58) Field of Classification Search
CPC ....... B60R 1/25; B60R 1/007; B60R 2300/60; E05F 15/40; E05F 15/73; E05F 2015/767; E05Y 2900/531; B60W 30/08; B60W 10/10; B60W 40/02; B60W 40/08; B60W 40/10; B60W 50/14; B60W 2040/089; B60W 2050/0005; B60W 2050/143; B60W 2420/403; B60W 2540/225; B60N 5/00; H04N 7/18; H04N 23/695
See application file for complete search history.

(56) References Cited

U.S. PATENT DOCUMENTS

| 11,624,228 | B1* | 4/2023 | Austria | E05F 15/73 340/5.72 |
| 2012/0005965 | A1* | 1/2012 | Oakley | B60J 5/06 49/506 |
| 2014/0205147 | A1* | 7/2014 | Maruoka | G06V 20/56 382/103 |
| 2017/0369016 | A1* | 12/2017 | Gurghian | B60W 50/14 |
| 2017/0371339 | A1* | 12/2017 | Charette | B60W 60/0016 |
| 2019/0032390 | A1* | 1/2019 | Myers | E05F 15/76 |
| 2020/0070725 | A1* | 3/2020 | Ding | B60R 99/00 |
| 2020/0111369 | A1* | 4/2020 | Cho | G01S 15/66 |
| 2020/0377016 | A1* | 12/2020 | Probert | E05B 81/64 |
| 2021/0009064 | A1* | 1/2021 | Kim | G06V 20/58 |
| 2021/0070282 | A1* | 3/2021 | Kim | B60W 30/06 |

(Continued)

FOREIGN PATENT DOCUMENTS

| KR | 101388689 B1 * | 4/2014 | |
| KR | 20230086113 A * | 6/2023 | |
| WO | WO-2024046580 A1 * | 3/2024 | B60Q 1/525 |

*Primary Examiner* — Fernando Alcon

(74) *Attorney, Agent, or Firm* — Slater Matsil, LLP

(57) ABSTRACT

An embodiment safety exit assisting device of a vehicle includes a camera and a processor electrically connected to the camera, wherein the processor is configured to obtain a side-view image of the vehicle captured by the camera, determine whether a dangerous situation associated with a door of the vehicle occurs based on the side-view image, and control the door of the vehicle or an operation of the vehicle in response to a determination that the dangerous situation occurs.

20 Claims, 21 Drawing Sheets

(56) References Cited

U.S. PATENT DOCUMENTS

| | | | |
|---|---|---|---|
| 2021/0094471 A1* | 4/2021 | Krishnamurthi | B60Q 9/00 |
| 2021/0284065 A1* | 9/2021 | Izumikawa | E05B 77/54 |
| 2021/0300358 A1* | 9/2021 | Sherrit | B60Q 9/008 |
| 2022/0195783 A1* | 6/2022 | Park | E05F 15/70 |
| 2024/0071231 A1* | 2/2024 | Nohara | B60K 35/28 |

* cited by examiner

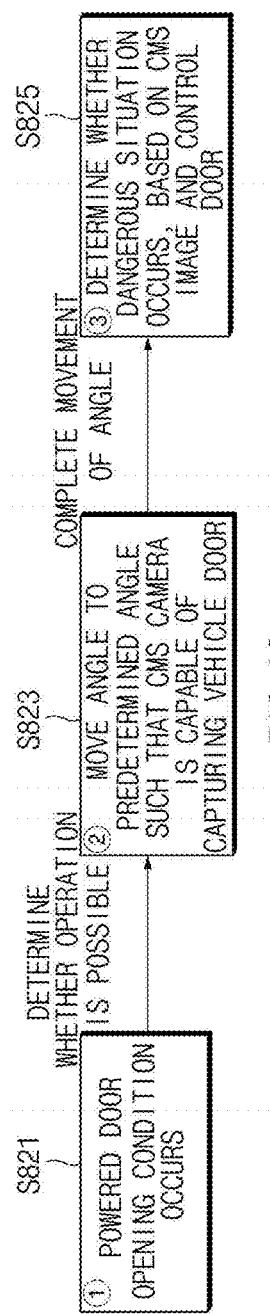

DEVICE FOR ASSISTING SAFETY EXIT OF VEHICLE AND METHOD THEREFOR

CROSS-REFERENCE TO RELATED APPLICATIONS

This application claims the benefit of Korean Patent Application No. 10-2022-0050246, filed on Apr. 22, 2022, which application is hereby incorporated herein by reference.

TECHNICAL FIELD

The present disclosure relates to a safety exit assisting device of a vehicle and a method therefor

BACKGROUND

When there is movement or force is applied to a powered door while the powered door is closed, a technology applied to conventional powered doors has been applied to detecting the movement or force by using a motion sensor, a pressure sensor, or the like and stopping closing of the door. However, additional hardware (HW) may be required to mount the sensor. The motion sensor may detect only movement inside the vehicle, and thus may be limited in detecting that clothing or a finger gets caught on the outside. Furthermore, a pressure sensor may detect a force that stops the closing while a door is closed. When a threshold at which the pressure sensor detects pressure is low, the pressure sensor may sense the pressure incorrectly. When the threshold is high, cases where strong pressure is not sensed, for example, pinching a finger of a small child or clothes may occur.

Current technologies are limited in preventing accidents caused by powered doors. As powered doors are continuously applied to vehicles, prevention of safety problems is essential.

SUMMARY

The present disclosure relates to a safety exit assisting device of a vehicle and a method therefor. Particular embodiments relate to a technology of preventing accidents that may occur, when a vehicle door is opened or closed, by using a camera monitoring system (CMS).

Embodiments of the present disclosure can solve problems occurring in the prior art while advantages achieved by the prior art are maintained intact.

An embodiment of the present disclosure provides a safety exit assisting device of a vehicle for preventing safety accidents such as catching clothes or a human body, which occurs in a powered door, based on a CMS image, and a method therefor.

An embodiment of the present disclosure provides the safety exit assisting device of a vehicle for reducing costs by using an existing CMS image without using a sensor, and a method therefor.

An embodiment of the present disclosure provides the safety exit assisting device of a vehicle for preventing safety accidents by performing powered door closing only when a door screen of the vehicle is completely obtained, and a method therefor.

An embodiment of the present disclosure provides the safety exit assisting device of a vehicle for preventing safety accidents by adding a warning function or a function of stopping the movement of a vehicle in case of jamming in a powered door and a general door, and a method therefor.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a safety exit assisting device of a vehicle includes a camera that captures a side-view image of the vehicle and at least one processor electrically connected to the camera. The at least one processor obtains the side-view image of the vehicle through the camera, determines whether a dangerous situation associated with a door of the vehicle occurs, based on the obtained side-view image, and controls at least one of the door of the vehicle or an operation of the vehicle in response to a determination that the dangerous situation occurs.

In an embodiment, when at least part of the door of the vehicle is not identified in the obtained side-view image, the at least one processor may determine that the dangerous situation occurs.

In an embodiment, the safety exit assisting device may further include a memory. When at least part of the door of the vehicle is not identified in the obtained side-view image, the at least one processor may determine that the dangerous situation occurs, based on a result of comparing the obtained side-view image and a side-view image, which is obtained while the vehicle is parked and is then stored in advance in the memory.

In an embodiment, when the door of the vehicle is a powered door, the at least one processor may obtain the side-view image through the camera after adjusting an angle of the camera to a predetermined angle while the powered door is operated, and may change the angle of the camera to the angle before the adjustment in response to a fact that the powered door is operated completely.

In an embodiment, when the door of the vehicle is a powered door, when at least part of the door of the vehicle is not identified in the obtained side-view image with a front door of the vehicle open, the at least one processor may obtain the side-view image through the camera after closing the front door and may cause a rear door to be opened or closed when it is not determined that the dangerous situation occurs in the obtained side-view image.

In an embodiment, when the door of the vehicle is a powered door, the at least one processor may determine whether the dangerous situation occurs, based on the obtained side-view image when a condition that the powered door is closed is satisfied, and may close the powered door in response to a fact that it is determined that the dangerous situation does not occur.

In an embodiment, when the door of the vehicle is a powered door, the at least one processor may detect an object within a threshold distance from the powered door based on the obtained side-view image when a condition that the powered door of the vehicle is opened is satisfied, and may open the powered door until the object is detected.

In an embodiment, when it is determined that there is an object connected to the vehicle in the obtained side-view image, the at least one processor may determine whether the dangerous situation occurs, based on at least one of a traveling direction of each of the object and the vehicle or a movement change amount of each of the object and the vehicle.

In an embodiment, after it is determined that the dangerous situation occurs, the at least one processor may determine that the dangerous situation is settled, in response to detecting at least one of a driver's gaze on a specific area, a specified voice command, a touch input, a specified door operation, or a shift gear change.

In an embodiment, the safety exit assisting device may further include an output device. When it is determined that the dangerous situation occurs, based on the obtained side-view image, the at least one processor may output at least one of a warning message or a warning sound through the output device or may control the operation of the vehicle by restricting a movement of the vehicle.

In an embodiment, the camera may include at least one of a camera monitoring system (CMS) camera or a surround view monitor (SVM) camera. The door of the vehicle may include at least one of a ghost door, an electric power door, a sliding door, or a folding door.

According to an embodiment of the present disclosure, a method for assisting a safety exit of a vehicle includes obtaining, by at least one processor, a side-view image of the vehicle through a camera, determining, by the at least one processor, whether a dangerous situation associated with a door of the vehicle occurs, based on the obtained side-view image, and controlling, by the at least one processor, at least one of the door of the vehicle or an operation of the vehicle in response to a determination that the dangerous situation occurs.

In an embodiment, the determining of whether the dangerous situation occurs may include determining, by the at least one processor, that the dangerous situation occurs when at least part of the door of the vehicle is not identified in the obtained side-view image.

In an embodiment, the determining of whether the dangerous situation occurs may include determining, by the at least one processor, that the dangerous situation occurs, based on a result of comparing the obtained side-view image and a side-view image, which is obtained while the vehicle is parked and is then stored in advance in a memory, when at least part of the door of the vehicle is not identified in the obtained side-view image.

In an embodiment, the obtaining of the side-view image of the vehicle may include obtaining, by the at least one processor, the side-view image through the camera after adjusting an angle of the camera to a predetermined angle while the powered door is operated, when the door of the vehicle is a powered door, and changing, by the at least one processor, the angle of the camera to the angle before the adjustment in response to a fact that the powered door is operated completely.

In an embodiment, the obtaining of the side-view image of the vehicle may include obtaining, by the at least one processor, the side-view image through the camera after closing the front door when the door of the vehicle is a powered door, when at least part of the door of the vehicle is not identified in the obtained side-view image with a front door of the vehicle open. The method may further include causing, by the at least one processor, a rear door to be opened or closed when it is not determined that the dangerous situation occurs in the obtained side-view image.

In an embodiment, the determining of whether the dangerous situation occurs may include determining, by the at least one processor, whether the dangerous situation occurs, based on the obtained side-view image when the door of the vehicle is a powered door, when a condition that the powered door is closed is satisfied. The method may further include closing, by the at least one processor, the powered door in response to a determination that the dangerous situation does not occur.

In an embodiment, the method may further include, when the door of the vehicle is a powered door, detecting, by the at least one processor, an object within a threshold distance from the powered door based on the obtained side-view image when a condition that the powered door of the vehicle is opened is satisfied, and opening, by the at least one processor, the powered door until the object is detected.

In an embodiment, the determining of whether the dangerous situation occurs may include determining, by the at least one processor, whether the dangerous situation occurs, based on at least one of a traveling direction of each of the object and the vehicle or a movement change amount of each of the object and the vehicle when it is determined that there is an object connected to the vehicle in the obtained side-view image.

In an embodiment, the method may further include, after it is determined that the dangerous situation occurs, determining, by the at least one processor, that the dangerous situation is settled, in response to detecting at least one of a driver's gaze on a specific area, a specified voice command, a touch input, a specified door operation, or a shift gear change.

BRIEF DESCRIPTION OF THE DRAWINGS

The above and other objects, features and advantages of embodiments of the present disclosure will be more apparent from the following detailed description taken in conjunction with the accompanying drawings, in which:

FIGS. 8A to 8C are flowcharts illustrating examples of controlling a powered door of a vehicle by using a side-view image of the vehicle in a device and method for assisting a safe exit of a vehicle, according to an embodiment of the present disclosure;

DETAILED DESCRIPTION OF ILLUSTRATIVE EMBODIMENTS

Figure 1:
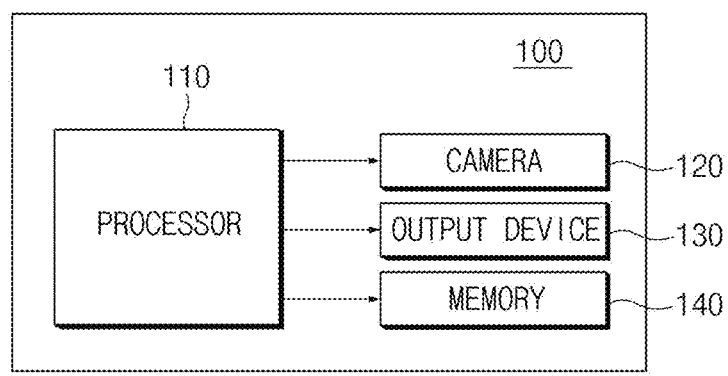
FIG. 1 is a block diagram of a safety exit assisting device of a vehicle, according to an embodiment of the present disclosure.

Hereinafter, some embodiments of the present disclosure will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make the subject matter of embodiments of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 12.

FIG. 1 is a block diagram of a safety exit assisting device 100 of a vehicle, according to an embodiment of the present disclosure.

Referring to FIG. 1, the safety exit assisting device 100 of a vehicle according to an embodiment may include a processor 110, a camera 120, an output device 130, and a memory 140. In various embodiments, the safety exit assisting device 100 of a vehicle may further include additional components in addition to the components illustrated in FIG. 1, or may omit at least one of the components illustrated in FIG. 1.

According to an embodiment, the processor 110 may be electrically connected to the camera 120, the output device 130, and the memory 140, may electrically control each of the components, may be an electrical circuit that executes instructions of software, and may perform various data processing and calculation described below.

According to an embodiment, the processor 110 may include, for example, an electronic control unit (ECU), a micro controller unit (MCU), or another sub-controller, which is mounted on a vehicle.

According to an embodiment, the processor 110 may perform data processing or calculation associated with control and/or communication of at least one other component(s) of the safety exit assisting device 100 of a vehicle by using instructions stored in the memory 140. Specific details related to an operation of the processor no will be described later with reference to FIGS. 2 and 7 to 11.

According to an embodiment, the camera 120 may be a module mounted on a vehicle to capture images around the vehicle, and may include a front camera, a rear camera, a first blind-spot camera, and a second blind-spot camera.

According to an embodiment, the output device 130 may output information depending on the instructions of the processor 110. For example, the output device 130 may include at least one of a liquid crystal display (LCD), a thin film transistor-liquid crystal display (TFT LCD), an organic light emitting diode (OLED) display, a flexible display, a 3D display, a transparent display, a head-up display (HUD), a touch screen, or a cluster.

According to an embodiment, the output device 130 may include a sound output module such as a speaker capable of outputting audio data.

According to an embodiment, the output device 130 is implemented as a touch screen combined with a touch sensor and may be used as an input device. For example, a touch film or a touch pad may be used as the touch sensor.

According to an embodiment, the memory 140 may store images captured by the camera 120 under the control of the processor 110.

According to an embodiment, the memory 140 may store various logics, algorithms, and programs required in a process of obtaining a blind-spot image of a vehicle in conjunction with a CMS, detecting a dangerous situation of the vehicle based on the obtained blind-spot image, and recording a blind-spot image of the vehicle in the detected dangerous situation.

According to an embodiment, the memory 140 may include at least one type of a storage medium among a flash memory type of a memory, a hard disk type of a memory, a micro type of a memory, or a card type (e.g., a Secure Digital (SD) card or an eXtream Digital (XD) card) of a memory, a random access memory (RAM) type of a memory, a static RAM (SRAM) type of a memory, a read-only memory (ROM) type of a memory, a programmable ROM (PROM) type of a memory, an electrically erasable PROM (EEPROM) type of a memory, a magnetic RAM (MRAM) type of a memory, a magnetic disk type of a memory, or an optical disc type of a memory.

Figure 2:
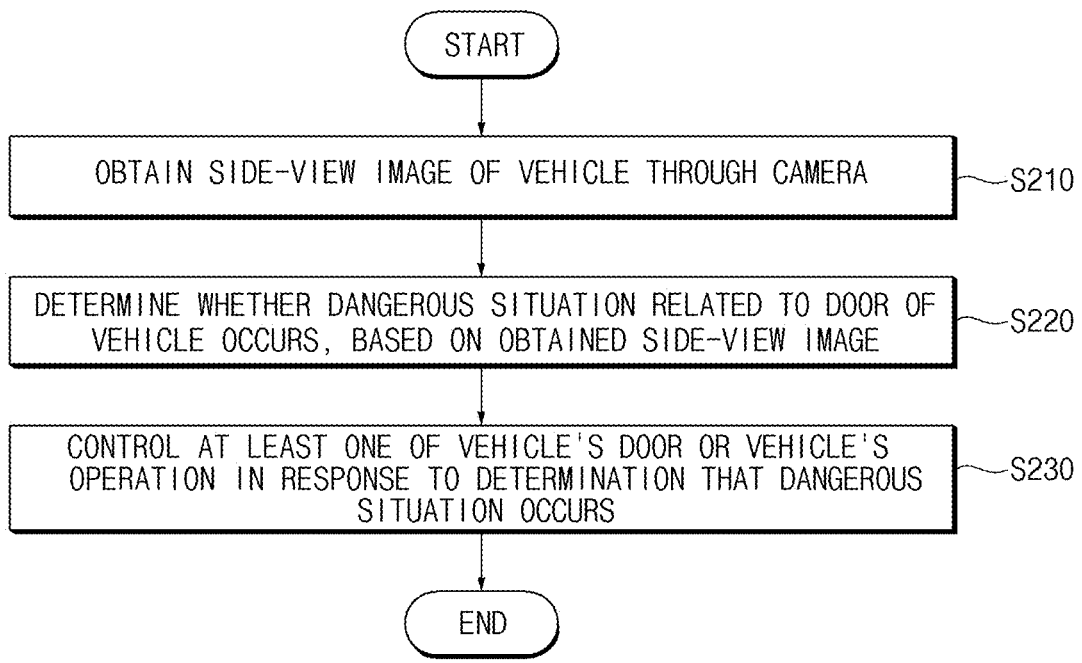
FIG. 2 is a flowchart illustrating a method for assisting a safe exit of a vehicle, according to an embodiment of the present disclosure.

FIG. 2 is a flowchart illustrating a method for assisting a safe exit of a vehicle, according to an embodiment of the present disclosure.

In the following embodiment, operation S210 to operation S230 may be sequentially performed, but are not always performed sequentially. For example, the order of operations may be changed, and at least two operations may be performed in parallel.

Referring to FIG. 2, in a device and method for assisting a safe exit of a vehicle according to an embodiment, a processor may obtain a side-view image of a vehicle through a camera (S210).

According to an embodiment, the camera may be implemented as a first blind-spot camera and a second blind-spot camera that are provided in a CMS.

For example, the first blind-spot camera may be mounted on a left side mirror of the vehicle to capture a first blind-spot image of the vehicle. The second blind-spot camera may be mounted on a right side mirror of the vehicle to capture a second blind-spot image of the vehicle.

The CMS may be a system that replaces left and right side mirrors of the vehicle, and may include the first blind-spot camera instead of the left side mirror, the second blind-spot camera instead of the right side mirror, a left display device that displays an image captured by the first blind-spot camera on a left side of an interior of the vehicle, and a right display device that displays an image captured by the second blind-spot camera on a right side of an interior of the vehicle. Because the CMS provides a blind-spot image of the vehicle, the CMS may not only prevent the risk of an accident during a lane change and secure a driver's blind-spot due to rainwater on a door window in case of rain, but also detect dangerous situations related to a door of the vehicle, such as jamming of a door.

According to an embodiment, the processor may obtain the first blind-spot image including the left door of the vehicle and/or the second blind-spot image including the right door of the vehicle through a camera.

According to an embodiment, the processor may obtain the first blind-spot image including the left door of the vehicle and/or the second blind-spot image including the right door of the vehicle through the camera on a display provided inside the vehicle.

According to an embodiment, the processor may determine whether a dangerous situation related to the door of the vehicle has occurred, based on the obtained side-view image (S220).

According to an embodiment, the processor may determine whether the dangerous situation related to the door has occurred based on the side-view image including the vehicle's door.

For example, the door may include at least one of a ghost door, an electric power door, a sliding door, or a folding door, but is not limited thereto.

Besides, for example, the dangerous situation related to a door may include a situation in which clothing or a finger is caught in the door.

According to an embodiment, the processor may determine whether a dangerous situation related to the door has occurred, based on identifying the door in the side-view image.

According to an embodiment, when at least part of the vehicle's door is not identified in the obtained side-view image, the processor may determine that the dangerous situation has occurred.

According to an embodiment, when at least part of the vehicle's door is not identified in the obtained side-view image, the processor may determine whether the dangerous situation has occurred, based on the result of comparing a side-view image, which is obtained while the vehicle is parked and is then stored in advance in a memory, and the obtained side-view image.

According to an embodiment, when the condition that the powered door is closed or opened is satisfied when the vehicle's door is a powered door, the processor may determine whether the dangerous situation has occurred, based on the vehicle's side-view image.

According to an embodiment, when it is determined that there is an object connected to the vehicle in the obtained side-view image, the processor may determine whether the dangerous situation has occurred, based on at least one of a movement direction of each of the object and the vehicle or a movement change amount of each of the object and the vehicle.

According to an embodiment, the processor may control at least one of the vehicle's door or the vehicle's operation in response to a determination that the dangerous situation has occurred (S230).

According to an embodiment, when it is determined that the dangerous situation has occurred, based on the obtained side-view image, the processor may output at least one of a warning message or a warning sound through an output device.

For example, when it is determined that the dangerous situation has occurred, based on the obtained side-view image, the processor may output the warning sound through an audio device.

Moreover, for example, when it is determined that the dangerous situation has occurred, based on the obtained side-view image, the processor may output the warning message (or a warning statement) for providing a notification of the dangerous situation through a CMS monitor, an audio, video, navigation (AVN) system, or a cluster.

According to an embodiment, when it is determined that the dangerous situation has occurred, based on the obtained side-view image, the processor may restrict the movement of the vehicle.

According to an embodiment, when it is determined that the dangerous situation has occurred, based on the obtained side-view image, the processor may automatically change or maintain the transmission to parking (P)-gear.

Figure 3:
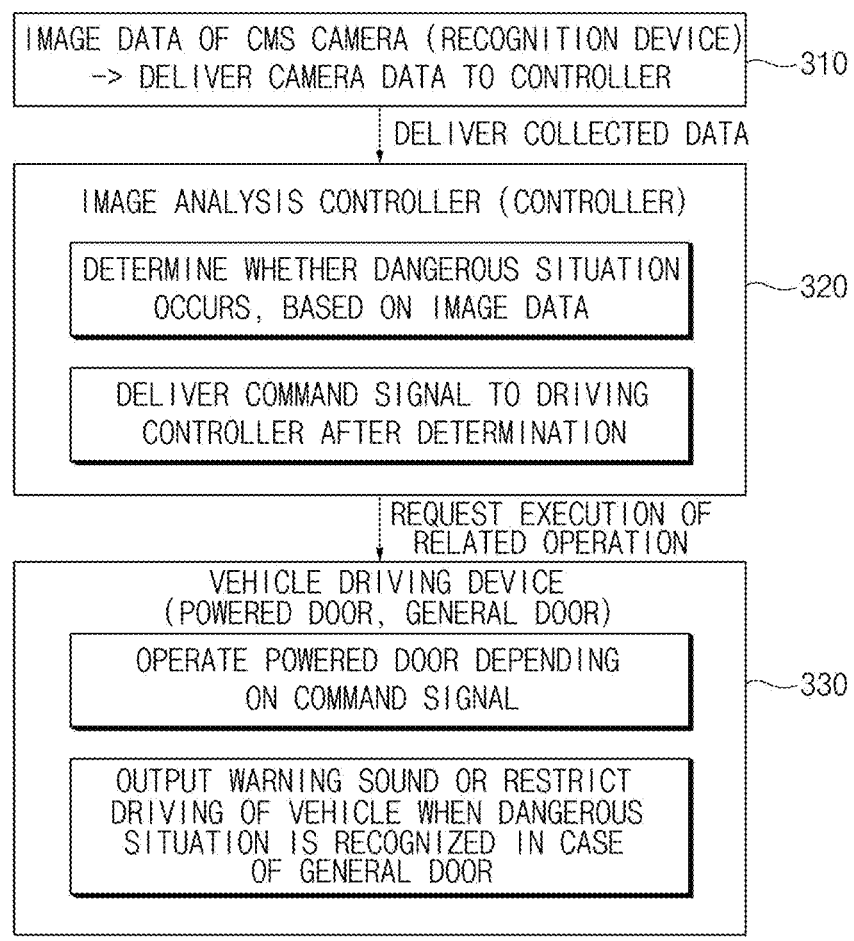
FIG. 3 shows an example of controlling a vehicle by using a vehicle side-view image of a CMS in a device and method for assisting a safe exit of the vehicle, according to an embodiment of the present disclosure.

FIG. 3 shows an example of controlling a vehicle by using a vehicle side-view image of a CMS in a device and method for assisting a safe exit of the vehicle, according to an embodiment of the present disclosure. Descriptions identical to or corresponding to the above-mentioned descriptions given with reference to FIG. 3 may be briefly described or omitted to avoid redundancy.

According to an embodiment, operations in a device and method for assisting a safe exit of the vehicle may be performed by using a recognition device 310, a controller 320, and a driving device 330. In various embodiments, the device and method for assisting a safe exit of the vehicle may further use an additional component in addition to the components illustrated in FIG. 3, or may be performed while at least one of the components illustrated in FIG. 3 is omitted. In this specification, the controller 320 may be referred to as an image analysis controller.

According to an embodiment, the recognition device 310 may collect image data around a vehicle from a camera. For example, the recognition device 310 may collect side-view image data of the vehicle from the camera.

According to an embodiment, the recognition device 310 may obtain side-view image data of a vehicle from a CMS camera or a SVM camera. According to an embodiment, the side-view image of the vehicle may include the vehicle's door.

According to an embodiment, the recognition device 310 may deliver, to the controller 320, the side-view image data of a vehicle that is collected from a camera.

According to an embodiment, the controller 320 may determine whether a safety accident (or a dangerous situation) related to the door of the vehicle has occurred, based on the received side-view image data of the vehicle.

According to an embodiment, the controller 320 may deliver a command signal to the driving device 330 based on a determination, based on the received side-view image data of the vehicle, of whether the safety accident (or a dangerous situation) has occurred.

According to an embodiment, the controller 320 may request the driving device 330 to perform an operation related to the safety accident.

For example, the operation related to the safety accident may include an operation of stopping the closing of a door, an operation of outputting a warning sound and/or a warning message, and an operation of restricting movement of a vehicle.

According to an embodiment, the driving device 330 may control an operation of the powered door depending on the command signal received from the controller 320.

According to an embodiment, when the vehicle's door is a powered door, when it is determined that a safety accident related to the vehicle door has been detected, the driving device 330 may stop closing the door based on the command signal received from the controller 320.

According to an embodiment, the driving device 330 may restrict the movement of the vehicle until the detection of a safety accident is terminated.

According to an embodiment, when the vehicle's door is not a powered door, the driving device 330 may restrict the movement of the vehicle until the detection of a safety accident is terminated.

According to an embodiment, when the vehicle's door is not a powered door, the driving device 330 may output at least one of a warning sound or a warning message for providing a notification of a safety accident through an output device.

Figure 4A:
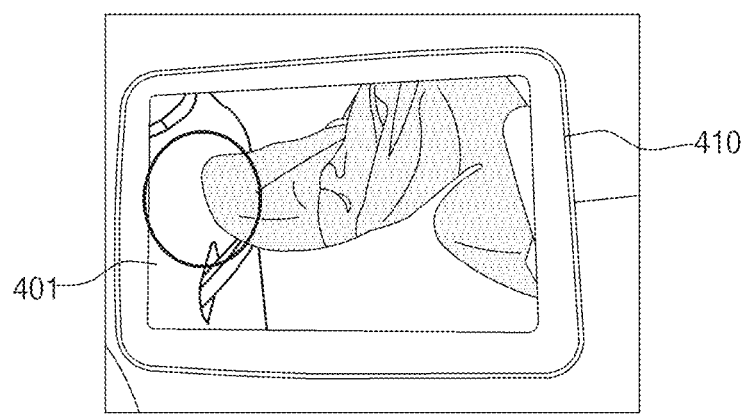
FIGS. 4A to 4C illustrate examples of determining whether a dangerous situation occurs, by using a vehicle side-view image in a device and method for assisting a safe exit of a vehicle, according to an embodiment of the present disclosure.
Figure 4B:
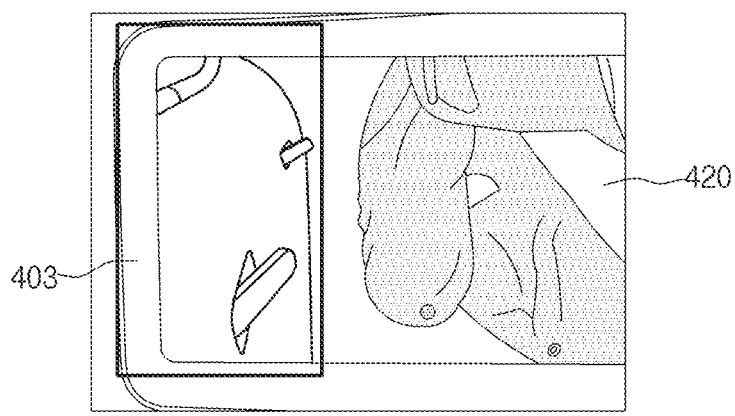
Figure 4C:
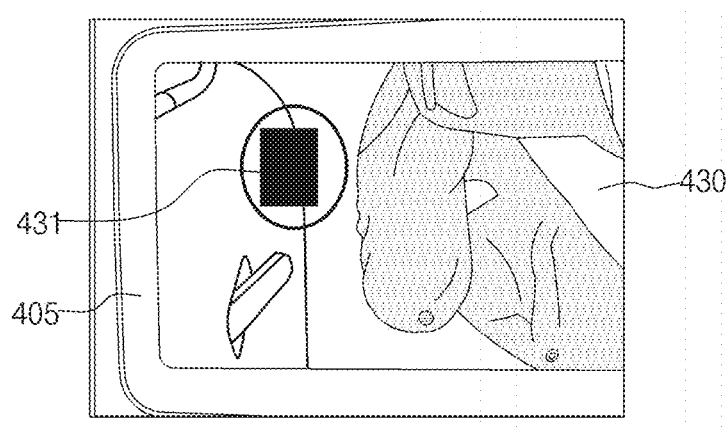

FIGS. 4A to 4C illustrate examples of determining whether a dangerous situation occurs, by using a vehicle side-view image in a device and method for assisting a safe exit of a vehicle, according to an embodiment of the present disclosure.

Referring to FIG. 4A, in the device and method for assisting a safe exit of a vehicle according to an embodiment, when an image of a vehicle door 401 is not completely secured in a first side-view image 410 obtained through a camera, a processor may determine that a dangerous situation has occurred.

According to an embodiment, when at least part of the vehicle door 401 is not identified in the first side-view image 410 obtained through a camera, the processor may determine that the dangerous situation has occurred.

According to an embodiment, when at least part of the vehicle door 401 is not identified in the first side-view image 410 because clothing or a body (e.g., a finger) gets caught in a door of a vehicle, the processor may determine that the dangerous situation has occurred.

Referring to FIG. 4B, in the device and method for assisting a safe exit of a vehicle according to an embodiment, when an image of a vehicle door 403 is completely secured in a second side-view image 420 obtained through the camera, the processor may determine that the dangerous situation has not occurred.

According to an embodiment, when the vehicle door 403 is completely identified in the second side-view image 420 obtained through the camera, the processor may determine that the dangerous situation has not occurred.

Referring to FIG. 4C, in the device and method for assisting a safe exit of a vehicle according to an embodiment, when an image of a vehicle door 405 is not completely secured in a third side-view image 430 obtained through the camera due to an object 431 attached to the vehicle, a processor may determine that a dangerous situation has occurred.

According to an embodiment, when at least part of the vehicle door 405 is not identified in the third side-view image 430 obtained through the camera due to the object 431 (e.g., a door guard) attached to the vehicle, the processor may determine that a dangerous situation has occurred.

According to an embodiment, when at least part of the vehicle door 405 is not identified in the third side-view image 430 due to the object 431 attached to the vehicle, the processor may determine whether the dangerous situation has occurred, based on the result of comparing a side-view image, which is obtained while the vehicle is parked and is then stored in advance, and the third side-view image 430.

For example, a state where the vehicle is parked may include a state where the vehicle's shift gear is in 'P' gear and an engine is turned off.

According to an embodiment, when it is determined that the pre-stored side-view image is different from the third side-view image 430, based on the result of comparing a side-view image, which is obtained while the vehicle is parked and is then stored in advance, and the third side-view image 430, when at least part of the vehicle door 405 is not identified in the third side-view image 430 due to the object 431 attached to the vehicle, the processor may determine whether a dangerous situation has occurred.

According to an embodiment, when it is determined that the pre-stored side-view image is identical or similar to the third side-view image 430, based on the result of comparing a side-view image, which is obtained while the vehicle is parked and is then stored in advance, and the third side-view image 430, when at least part of the vehicle door 405 is not identified in the third side-view image 430 due to the object 431 attached to the vehicle, the processor may determine that a dangerous situation has not occurred.

Figure 5A:
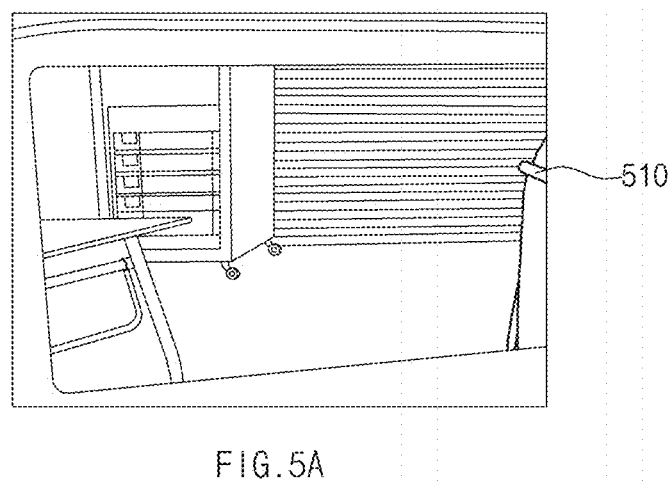
FIGS. 5A to 5C illustrate examples of using a vehicle side-view image to determine whether a dangerous situation occurs in a device and method for assisting a safe exit of a vehicle, according to an embodiment of the present disclosure.
Figure 5B:
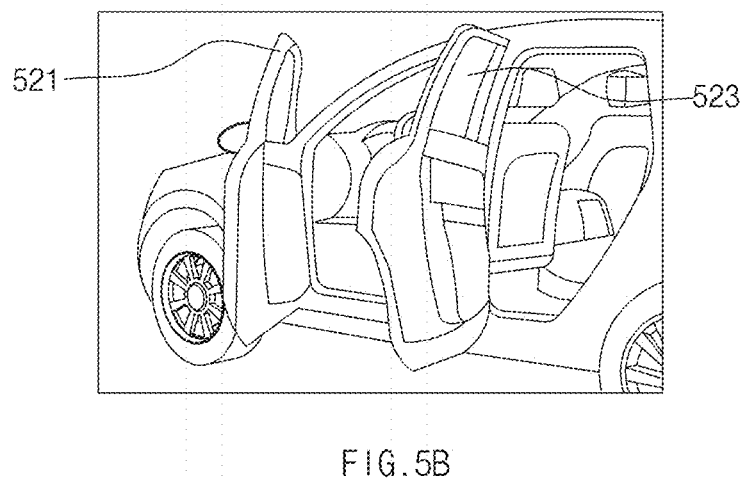
Figure 5C:
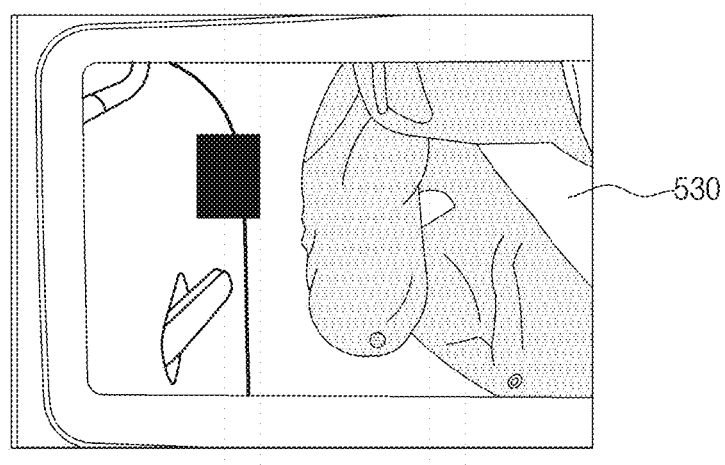

FIGS. 5A to 5C illustrate examples of using a vehicle side-view image to determine whether a dangerous situation occurs in a device and method for assisting a safe exit of a vehicle, according to an embodiment of the present disclosure.

Referring to FIG. 5A, in the device and method for assisting a safe exit of a vehicle according to an embodiment, the processor may adjust an angle of a camera to a predetermined angle while operating a powered door, may obtain a first image 510 through the camera, and may change the angle of the camera to the angle before adjustment in response to a fact that the powered door is operated completely.

According to an embodiment, to determine whether a dangerous situation has occurred, the processor may obtain the first image 510 including the vehicle's door through the camera.

According to an embodiment, when the image of the vehicle door is not identified (or secured) because the camera angle is set to the outside of the vehicle, the processor may adjust the angle of the camera to the predetermined angle.

For example, the predetermined angle may refer to an angle at which the camera is capable of obtaining a door image, and may mean an angle within a specific angle (e.g., 110 degrees) from the door.

According to an embodiment, the processor may change (or adjust) the angle of the camera to the predetermined angle at a point in time when the powered door is operated.

According to an embodiment, the processor may change the angle of the camera to the predetermined angle and then may obtain an image including the vehicle's door through the camera.

According to an embodiment, the processor may determine whether the dangerous situation has occurred, based on the image including the vehicle's door.

According to an embodiment, when it is determined that the dangerous situation has occurred, based on the image including the vehicle's door, the processor may allow the vehicle's door to be opened or closed completely.

According to an embodiment, the processor may change the angle of the camera to the angle before adjustment in response to the fact that the powered door is operated completely.

Referring to FIG. 5B, in the device and method for assisting a safe exit of a vehicle according to an embodiment, when at least part of the vehicle's door is not identified in the side-view image obtained from the camera with a front door 521 of the vehicle open, the processor may close the front door 521, may obtain a side-view image through the camera, and may determine whether a dangerous situation occurs in the obtained side-view image.

According to an embodiment, when it is not determined that a dangerous situation has not occurred in the obtained side-view image, the processor may allow a rear door 523 to be opened or closed.

According to an embodiment, when at least part of the rear door 523 of the vehicle is not identified in the side-view image obtained from the camera because the front door 521 of the vehicle is open with the rear door 523 open, the processor may allow doors to be closed in order from the front door 521 to the rear door 523.

According to an embodiment, when the processor does not receive a signal for closing the front door 521 while both the front door 521 and the rear door 523 are open, the processor may allow the rear door 523 to be not closed.

According to an embodiment, when the processor receives the signal for closing the front door 521 while both the front door 521 and the rear door 523 are open, the processor may obtain a side-view image of the vehicle through the camera after the front door 521 is closed.

According to an embodiment, the processor may determine whether a dangerous situation has occurred, based on the side-view image of the vehicle obtained through the camera after the front door 521 is closed.

According to an embodiment, when it is determined that the dangerous situation has not occurred, based on the side-view image of the vehicle obtained through the camera after the front door 521 is closed, the processor may allow the rear door 523 to be closed.

Referring to FIG. 5C, in the device and method for assisting a safe exit of a vehicle according to an embodiment, when it is impossible to analyze an entire image in a second image 530 obtained through the camera, the processor may determine whether the dangerous situation has occurred, based on determining the continuity of a line created by mapping edges of the vehicle.

According to an embodiment, when it is impossible to analyze an entire vehicle door in the second image 530 due to an object attached to the vehicle, the processor may determine whether the dangerous situation has occurred, based on determining the continuity of a line created by mapping edges of the vehicle.

According to an embodiment, when it is determined that the line is continuous by mapping the edges of the vehicle, the processor may determine that no dangerous situation has occurred.

According to an embodiment, when it is not determined that the line is continuous by mapping the edge of the vehicle, the processor may determine that the dangerous situation has occurred.

Figure 6A:
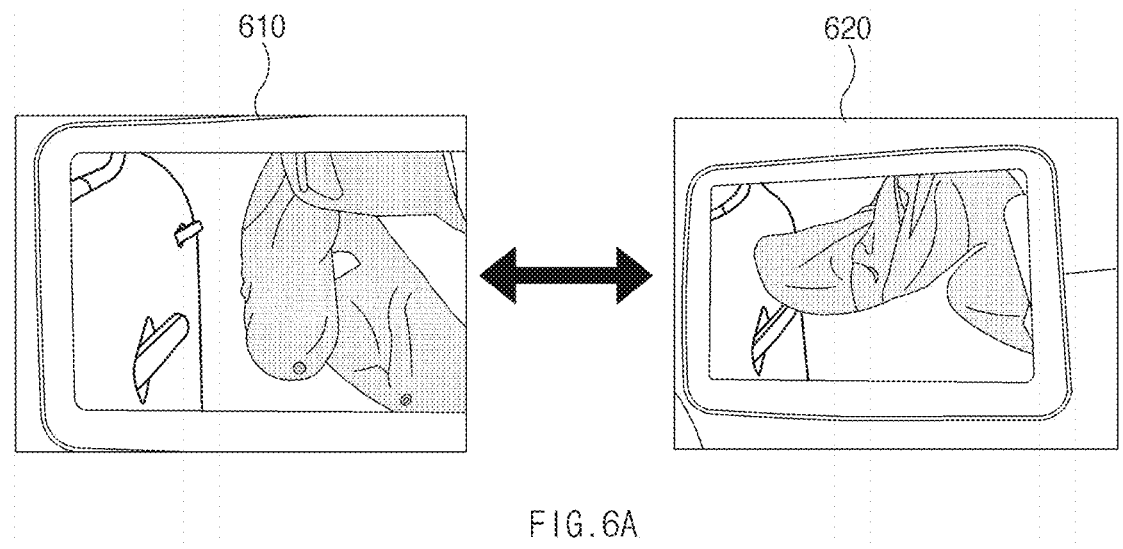
FIG. 6A illustrates a first embodiment of determining whether a dangerous situation occurs, by using a vehicle side-view image in a device and method for assisting a safe exit of a vehicle, according to an embodiment of the present disclosure.

FIG. 6A illustrates a first embodiment of determining whether a dangerous situation occurs, by using a vehicle side-view image in a device and method for assisting a safe exit of a vehicle, according to an embodiment of the present disclosure.

Referring to FIG. 6A, in a device and method for assisting a safe exit of a vehicle according to an embodiment, a processor may determine whether a dangerous situation has occurred, by comparing a pre-stored image 610 with a vehicle side-view image 620.

According to an embodiment, when the vehicle door is normally closed, the processor may store an image including a vehicle door.

For example, when the vehicle door is normally closed, the processor may obtain an image including the vehicle door and may store the image in a memory.

According to an embodiment, when it is determined that at least part of the vehicle door is not identified in the vehicle side-view image 620, the processor may determine that a dangerous situation has occurred, based on the comparison between the pre-stored image 610, which is obtained while the door is normally closed and is stored, and the vehicle side-view image 620 obtained through a camera.

Figure 6B:
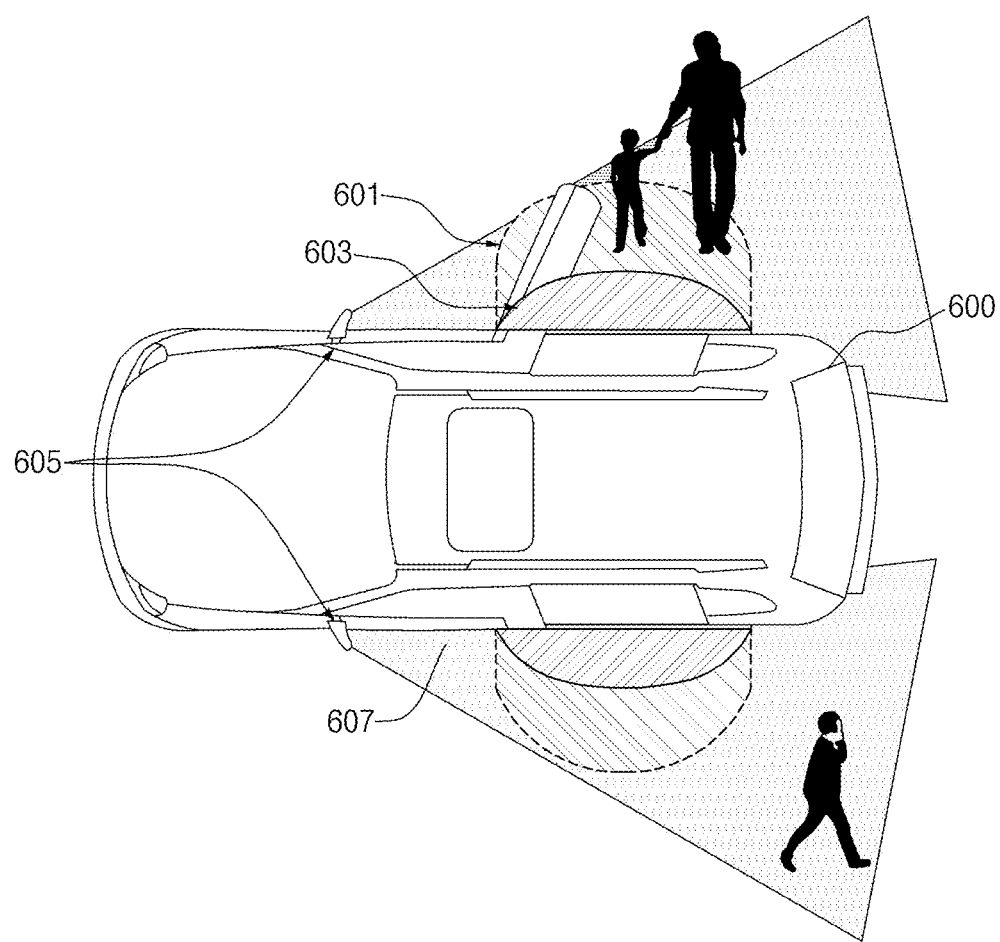
FIG. 6B illustrates a second embodiment of determining whether a dangerous situation occurs, by using a vehicle side-view image in a device and method for assisting a safe exit of a vehicle, according to an embodiment of the present disclosure.

FIG. 6B illustrates a second embodiment of determining whether a dangerous situation occurs, by using a vehicle side-view image in a device and method for assisting a safe exit of a vehicle, according to an embodiment of the present disclosure.

Referring to FIG. 6B, in a device and method for assisting a safe exit of a vehicle according to an embodiment, a processor may determine whether a dangerous situation has occurred, by monitoring an area around a vehicle.

According to an embodiment, the processor may detect at least one object in a first area 607 through a side camera 605 provided in a vehicle 600. In this specification, the first area 607 may be referred to as the camera detection area 607.

According to an embodiment, the processor may monitor a second area 601 through the side camera 605. In this specification, the second area 601 may be referred to as the monitoring area 601.

According to an embodiment, when at least one object within the monitoring area 601 approaches the movement direction of the vehicle 600, the processor may determine that the dangerous situation has occurred.

According to an embodiment, when the movement change amount of at least one object within the monitoring area 601 is greater than or equal to a threshold, the processor may determine that the dangerous situation has occurred.

According to an embodiment, when an object is detected within a third area 603 included in the second area 601, the processor may determine that the dangerous situation has occurred. In this specification, the third area 603 may be referred to as the dangerous area 603.

According to an embodiment, when an object is detected within the dangerous area 603 while the processor monitors an area around the vehicle through the side camera 605, the processor may determine that the dangerous situation has occurred.

Figure 6C:
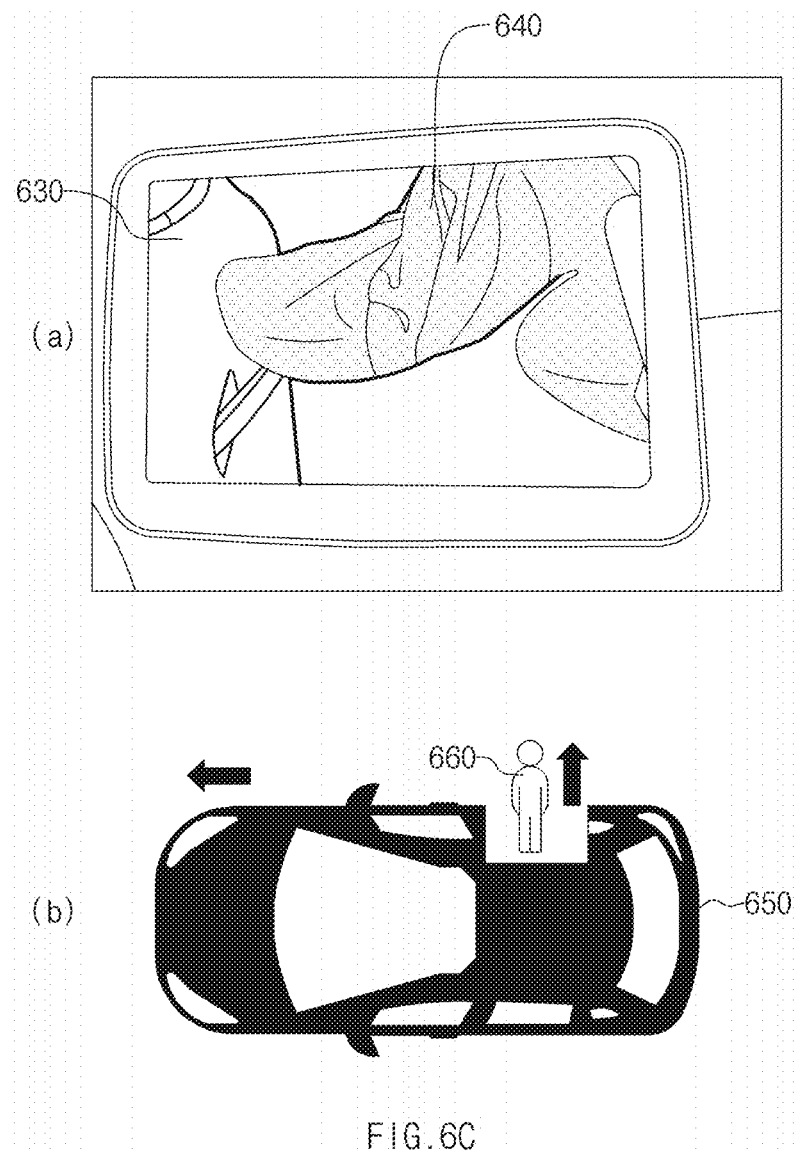
FIG. 6C illustrates a third embodiment of determining whether a dangerous situation occurs, by using a vehicle side-view image in a device and method for assisting a safe exit of a vehicle, according to an embodiment of the present disclosure.

FIG. 6C illustrates a third embodiment of determining whether a dangerous situation occurs, by using a vehicle side-view image in a device and method for assisting a safe exit of a vehicle, according to an embodiment of the present disclosure.

Referring to (a) of FIG. 6C, in a device and method for assisting a safe exit of a vehicle according to an embodiment, when it is determined that there is an object 640 connected to a vehicle 630 in the side-view image of the vehicle 630, a processor may determine whether a dangerous situation has occurred.

According to an embodiment, when it is determined that there is the object 640 connected to the vehicle 630 in the side-view image of the vehicle 630, the processor may determine whether the dangerous situation has occurred, based on a movement change amount and/or movement direction of each of the vehicle 630 and the object 640.

Referring to (b) of FIG. 6C, in a device and method for assisting a safe exit of a vehicle according to an embodiment, when it is determined that there is an object 660 connected to a vehicle 650 in the side-view image of the vehicle 650, a processor may determine whether a dangerous situation has occurred, based on comparing the traveling direction of the vehicle 650 and the traveling direction of the object 660.

According to an embodiment, when the traveling direction of the vehicle 650 is the same as the traveling direction of the object 660, the processor may determine that no dangerous situation has occurred.

According to an embodiment, when the traveling direction of the vehicle 650 is not the same as the traveling direction of the object 660, the processor may determine that the dangerous situation has occurred.

According to an embodiment, when it is determined that the object 660 connected to the vehicle 650 is present in the side-view image of the vehicle 650, the processor may determine whether the dangerous situation has occurred, based on comparing the movement (or motion) change amount of the vehicle 650 and the movement change amount of the object 660.

According to an embodiment, when the vehicle 650 and the object 660 do not move together, the processor may determine that the dangerous situation has occurred.

In detail, when the movement change amount of the vehicle 650 is greater than or equal to a threshold and the movement change amount of the object 660 is less than the threshold, the processor may determine that the dangerous situation has occurred.

Furthermore, when the movement change amount of the object 660 is greater than or equal to the threshold and the movement change amount of the vehicle 650 is less than the threshold, the processor may determine that the dangerous situation has occurred.

Figure 6D:
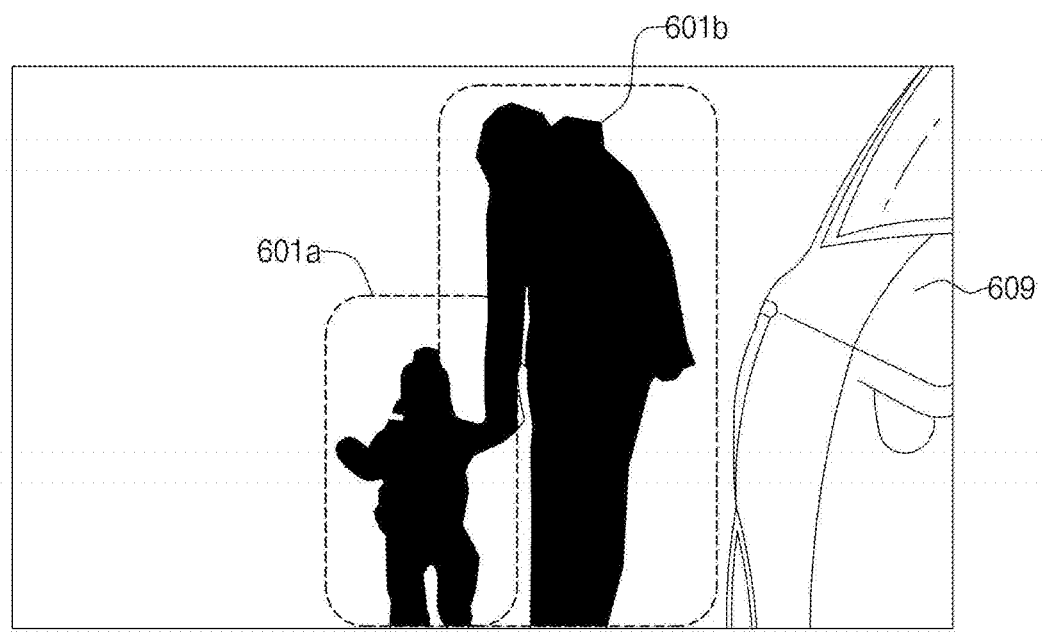
FIG. 6D illustrates a fourth embodiment of determining whether a dangerous situation occurs, by using a vehicle side-view image in a device and method for assisting a safe exit of a vehicle, according to an embodiment of the present disclosure.

FIG. 6D illustrates a fourth embodiment of determining whether a dangerous situation occurs, by using a vehicle side-view image in a device and method for assisting a safe exit of a vehicle, according to an embodiment of the present disclosure.

Referring to FIG. 6D, in a device and method for assisting a safe exit of a vehicle according to an embodiment, a processor may determine whether a dangerous situation has occurred, based on artificial intelligence (AI) and/or deep learning.

According to an embodiment, when users (e.g., passengers) 601a and 601b of a vehicle 609 enter or exit, the processor may learn actions of the users 601a and 601b according to a signal corresponding to the open/close of a door.

According to an embodiment, the processor may learn a movement change amount at a point in time when the users 601a and 601b move around the vehicle 609 before entering or after exiting.

According to an embodiment, the processor may determine whether the dangerous situation has occurred, based on learning the movement change amount at a point in time when the users 601a and 601b move around the vehicle 609 before entering or after exiting.

For example, when the users 601a and 601b enter and exit, the processor may learn movements (or movement change amounts) corresponding to actions such as wearing clothes next to the vehicle 609 or using a mobile phone, may compare movements (or movement change amounts) corresponding to unlearned actions (e.g., falling down towards the vehicle, or the like) when the users 601a and 601b enter and exit, and may determine whether the dangerous situation has occurred.

According to an embodiment, when movements (or movement change amounts) corresponding to unlearned actions (e.g., falling down towards the vehicle, or the like) are detected while the users 601a and 601b enter and exit, the processor may determine that the dangerous situation has occurred.

Figure 7:
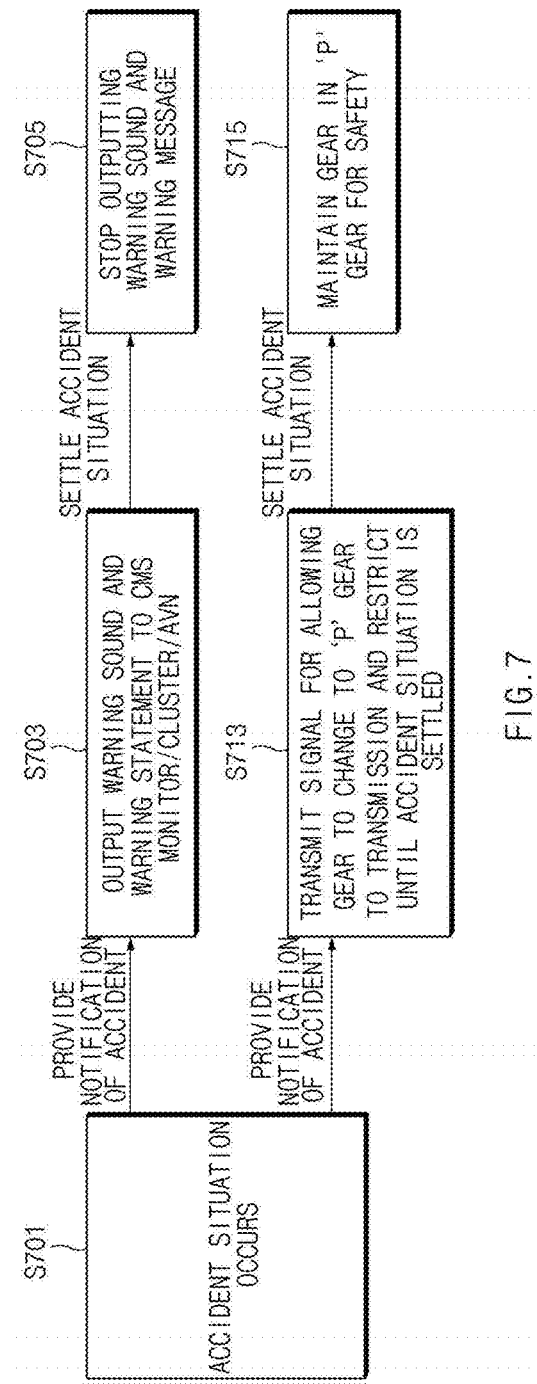
FIG. 7 is a flowchart illustrating an example of outputting a warning or controlling the movement of a vehicle when a dangerous situation occurs in a device and method for assisting a safe exit of a vehicle, according to an embodiment of the present disclosure.

FIG. 7 is a flowchart illustrating an example of outputting a warning or controlling the movement of a vehicle when a dangerous situation occurs in a device and method for assisting a safe exit of a vehicle, according to an embodiment of the present disclosure.

In the following embodiment, operation S701 to operation S715 may be sequentially performed, but are not always performed sequentially. For example, the order of operations may be changed, and at least two operations may be performed in parallel.

Referring to FIG. 7, in a device and method for assisting a safe exit of a vehicle according to an embodiment, the processor may detect occurrence of an accident situation (or dangerous situation or accident condition) (S701).

According to an embodiment, the processor may sense (or detect) the occurrence of the accident situation associated with a vehicle door.

According to an embodiment, the processor may detect the occurrence of the accident situation based on the side-view image of the vehicle obtained through a camera.

For example, the accident situation (or a dangerous situation associated with a vehicle door) may include a situation in which clothing or a part of the body gets caught in a vehicle door when a user of the vehicle enters or exits.

According to an embodiment, when it is determined that the accident situation has occurred, the processor may output a warning sound and/or a warning statement to a CMS monitor, a cluster, or an AVN (S703).

According to an embodiment, when it is determined that the accident situation has occurred, the processor may output the warning message (e.g., a passenger door is not closed normally) indicating a dangerous situation through at least one of a CMS monitor, an AVN, or a cluster.

According to an embodiment, when it is determined that the accident situation has occurred, the processor may output the warning sound through an audio device.

According to an embodiment, when it is determined that the accident situation has occurred, the processor may transmit, to a transmission, a signal for allowing a gear to change to a parking 'P' gear and may restrict gear changes until the accident situation is settled with the gear changed to the 'P' gear (S713).

According to an embodiment, when it is determined that the accident situation has occurred, the processor may identify a shift gear.

According to an embodiment, when it is determined that the accident situation has occurred, when the shift gear is one of drive 'D' gear, reverse 'R' gear, or neutral 'N' gear, the processor may automatically shift the gear to 'P' gear.

According to an embodiment, when it is determined that the accident situation has occurred, when the shift gear is 'P' gear, the processor may maintain the gear in 'P' gear.

According to an embodiment, after detecting the occurrence of the accident situation, the processor may determine that the accident situation is settled according to various embodiments.

According to an embodiment, the processor may determine that the accident situation is settled, based on detecting a driver's gaze.

For example, when it is determined that the driver is watching the CMS monitor (e.g., the CMS monitor that displays an image including a door where a dangerous situation has occurred) during a specific time or more, through eye-tracking after the accident situation occurred, the processor may determine that the accident situation is settled.

According to an embodiment, the processor may determine that the accident situation is settled, based on recognizing a voice command.

For example, after the accident situation has occurred, when recognizing a specific voice command (e.g., start driving) by using a voice recognition function of the AVN, the processor may determine that the accident situation is settled.

According to an embodiment, the processor may determine that the accident situation is settled, based on receiving a user input.

For example, after the accident situation has occurred, when receiving an input to a specific button (e.g., a center fascia) or touch screen in a vehicle, the processor may determine that the accident situation is settled.

According to an embodiment, the processor may determine that the accident situation is settled, based on detecting an operation of the door.

For example, after the accident situation has occurred, when performing an operation of opening a door where the accident situation has occurred, and closing the door again, the processor may determine that the accident situation is settled.

According to an embodiment, the processor may determine that the accident situation is settled, based on detecting a change in a shift gear.

For example, after the accident situation has occurred, when the shift gear is changed to 'P' gear after the warning is output while the shift gear is in one of 'D', 'R', or 'N' gear, the processor may determine that the accident situation is settled.

According to an embodiment, when it is determined that the accident situation is settled, the processor may stop outputting a warning sound and a warning message (S705).

According to an embodiment, when it is determined that the accident situation is settled, based on the side-view image of a vehicle obtained through a camera, the processor may stop outputting a warning sound and a warning message.

According to an embodiment, when it is determined that the accident situation is settled, the processor may maintain the gear in 'P' gear (S715).

According to an embodiment, even when it is determined that the accident situation is settled, the processor may maintain the gear in 'P' gear for safety.

Figure 8A:
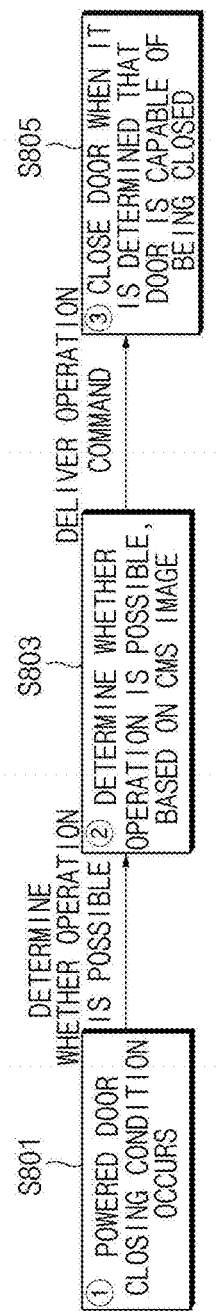
Figure 8B:
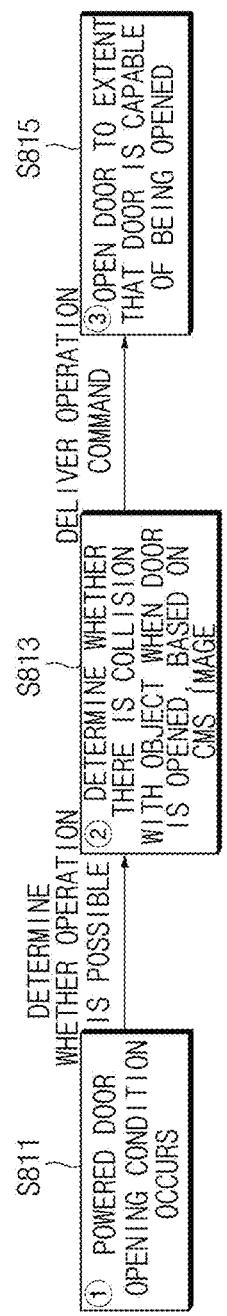

FIGS. 8A to 8C are flowcharts illustrating examples of controlling a powered door of a vehicle by using a side-view image of the vehicle in a device and method for assisting a safe exit of a vehicle, according to an embodiment of the present disclosure.

In the following embodiment, operation S801 to operation S825 may be sequentially performed, but are not always performed sequentially. For example, the order of operations may be changed, and at least two operations may be performed in parallel.

Referring to FIG. 8A, in a device and method for assisting a safe exit of a vehicle according to an embodiment, a processor may detect that a powered door closing condition occurs (S801).

For example, the powered door may include a ghost door, a button-type powered door, an electrically-powered sliding door, or an electrically-powered folding door.

According to an embodiment, the processor may determine whether an operation of the powered door is possible, based on an image obtained through the CMS camera (S803).

According to an embodiment, the processor may determine whether the powered door is capable of being closed, by analyzing image data obtained through the CMS camera.

For example, when it is determined that a dangerous situation has not occurred, by analyzing the image data obtained through the CMS camera, the processor may determine that the powered door is capable of being closed. For example, when it is determined that a dangerous situation has occurred, by analyzing the image data obtained through the CMS camera, the processor may determine that the powered door is incapable of being closed.

According to an embodiment, when it is determined that the closing of the powered door is possible, based on the image obtained through the CMS camera, the processor may close the door (S805).

According to an embodiment, when it is determined that a dangerous situation has not occurred, based on the image obtained through the CMS camera, the processor may close the powered door by delivering a signal to a driving device.

Referring to FIG. 8B, in a device and method for assisting a safe exit of a vehicle according to an embodiment, a processor may detect that a powered door opening condition occurs (S811).

According to an embodiment, the processor may determine whether there is a collision with at least one object when the powered door is opened, based on an image obtained through the CMS camera (S813).

According to an embodiment, the processor may determine whether an object within a specific distance is detected from the powered door, based on the image obtained through the CMS camera.

According to an embodiment, the processor may open the powered door to the extent that it is determined that the powered door is capable of being opened (S815).

According to an embodiment, when the object is detected within the specific distance from the edge of the powered door, the processor may stop opening the door.

According to an embodiment, when the object is not detected within the specific distance within the edge of the door, the processor may maximally open the door.

Referring to FIG. 8C, in a device and method for assisting a safe exit of a vehicle according to an embodiment, a processor may detect that a powered door opening condition occurs (S821).

According to an embodiment, the processor may move an angle of a CMS camera to a predetermined angle such that the CMS camera is capable of capturing a vehicle door (S823).

According to an embodiment, when the image of the vehicle door is not identified (or secured) in an image captured from the CMS camera, the processor may adjust the angle of the camera to the predetermined angle.

For example, according to an embodiment, when the image of the vehicle door is not identified (or displayed) because the camera angle is set to the outside of the vehicle, the processor may adjust the angle of the camera to the predetermined angle.

According to an embodiment, the processor may move the angle of the CMS camera to the predetermined angle such that the CMS camera is capable of capturing the vehicle door, may determine whether a dangerous situation has occurred, based on the image obtained through the CMS camera, and may control the door (S825).

Figure 9:
FIG. 9 is a flowchart illustrating an example of controlling a door of a vehicle by using a side-view image of the vehicle in a device and method for assisting a safe exit of a vehicle, according to an embodiment of the present disclosure.

FIG. 9 is a flowchart illustrating an example of controlling a door of a vehicle by using a side-view image of the vehicle in a device and method for assisting a safe exit of a vehicle, according to an embodiment of the present disclosure.

In the following embodiment, operation S901 to operation S905 may be sequentially performed, but are not always performed sequentially. For example, the order of operations may be changed, and at least two operations may be performed in parallel.

Referring to FIG. 9, in a device and method for assisting a safe exit of a vehicle according to an embodiment, the processor may detect that a general door is closed (S901). For example, the general door is a vehicle door, not a powered door, and may include a folding door of a bus, a sliding door of a bus, and the like.

According to an embodiment, when detecting that the general door is closed, the processor may receive a signal corresponding to the closing of the general door.

According to an embodiment, the processor may determine whether a dangerous situation has occurred, based on the CMS image in response to receiving a signal corresponding to the closing of the general door (S903). For example, the dangerous situation may include a situation in which a body, belongings, clothing, or the like are caught in a door.

According to an embodiment, when it is determined that the dangerous situation has not occurred, based on the CMS image, the processor may allow the vehicle to move (S905).

According to an embodiment, when it is determined that the dangerous situation has not occurred, based on the CMS image, the processor may allow the vehicle to move without outputting a warning sound or warning message.

Figure 10:
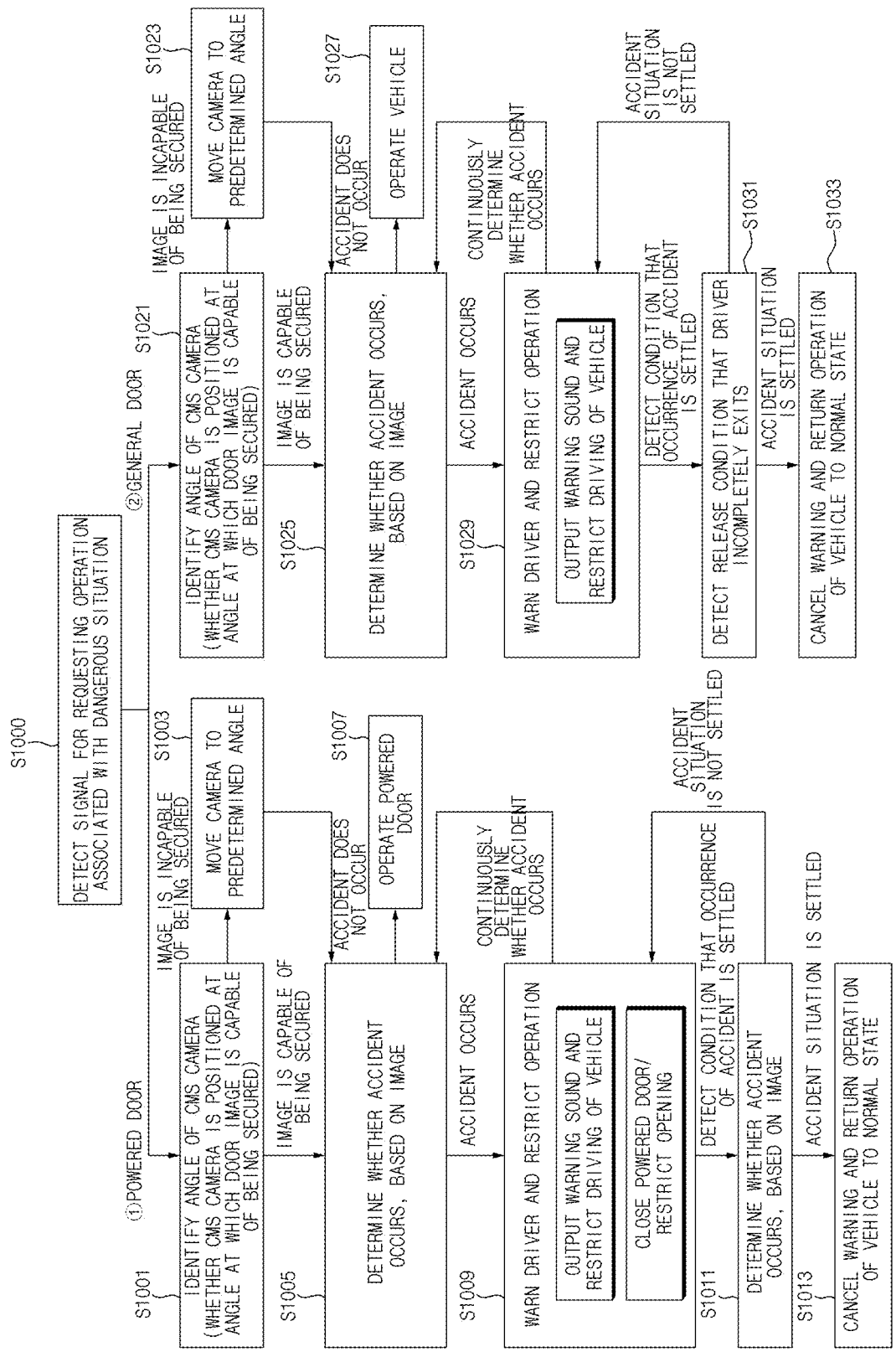
FIG. 10 is a flowchart illustrating an example of determining whether a dangerous situation related to a door of a vehicle occurs and controlling an operation of a vehicle door or the vehicle based on a side-view image of the vehicle in a device and method for assisting a safe exit of a vehicle, according to an embodiment of the present disclosure.

FIG. 10 is a flowchart illustrating an example of determining whether a dangerous situation related to a door of a vehicle occurs and controlling an operation of a vehicle door or the vehicle based on a side-view image of the vehicle in a device and method for assisting a safe exit of a vehicle, according to an embodiment of the present disclosure.

Referring to FIG. 10, when a vehicle door is a powered door, operation S1000, operation S1001, operation S1003, operation S1005, operation S1007, operation S1009, operation S1011, and operation S1013 may be performed.

Referring to FIG. 10, when the vehicle door is a general door, operation S1000, operation S121, operation S1023, operation S1025, operation S1027, operation S1029, operation S1031, and operation S1033 may be performed.

In the following embodiment, operation S1000 to operation S1033 may be sequentially performed, but are not always performed sequentially. For example, the order of operations may be changed, and at least two operations may be performed in parallel.

Descriptions identical to or corresponding to the above-mentioned descriptions given with reference to FIG. 10 is briefly described or omitted to avoid redundancy.

Referring to FIG. 10, in a device and method for assisting a safe exit of a vehicle according to an embodiment, when the vehicle door is the powered door, the processor may detect a signal for requesting an operation associated with a dangerous situation (S1000).

According to an embodiment, when it is determined that a dangerous situation associated with the vehicle door has occurred, the processor may receive a signal for requesting an operation associated with the dangerous situation.

According to an embodiment, the processor may check (or identify) an angle of the CMS camera (S1001).

According to an embodiment, the processor may determine whether the CMS camera is positioned at an angle at which an image of the vehicle door is capable of being secured. In detail, the processor may determine whether the CMS camera is positioned at an angle at which the CMS camera is capable of capturing the image of the vehicle door.

According to an embodiment, the processor may move the camera to a predetermined angle (S1003).

According to an embodiment, when it is not determined that the CMS camera is located at an angle at which the CMS camera is capable of capturing an image of the vehicle door, the processor may move the camera at a predetermined angle such that the vehicle door is captured.

For example, a case that it is not determined that the CMS camera is located at an angle at which the CMS camera is capable of capturing an image of the vehicle door may include a case that the vehicle door is not captured because the camera is facing the outside of the vehicle.

According to an embodiment, the processor may determine whether an accident has occurred, based on the image obtained through the camera (S1005).

According to an embodiment, the processor may determine whether an accident related to the vehicle door has occurred, based on an image obtained through the camera. For example, the processor may determine whether an accident has occurred, by determining whether the entire vehicle door is identified in the side-view image of the vehicle.

According to an embodiment, when it is determined that an accident has not occurred, based on the image obtained through the camera, the processor may operate the powered door (S1007).

According to an embodiment, when the entire vehicle door is identified in the vehicle's side-view image, the processor may allow the powered door to be opened or closed, by determining that no accident has occurred.

According to an embodiment, when it is determined that the accident has occurred, based on the image obtained through the camera, the processor may output a warning and may restrict the operation of the vehicle (S1009).

According to an embodiment, when at least part of the vehicle door is not identified in the side-view image of the vehicle, the processor may determine that the accident has occurred.

According to an embodiment, when it is determined that the accident has occurred, based on the side-view image of the vehicle, the processor may output at least one of a warning sound or a warning message through an output device.

According to an embodiment, when it is determined that the accident has occurred, based on the side-view image of the vehicle, the processor may restrict the movement of the vehicle.

According to an embodiment, when it is determined that the accident has occurred, based on the side-view image of the vehicle, the processor may restrict the opening and closing of the vehicle door.

According to an embodiment, even after detecting the occurrence of an accident, the processor may continuously determine whether the occurrence of an accident is detected. For example, the processor may determine whether the occurrence of an accident is still detected, by monitoring an area around the vehicle through the CMS camera.

According to an embodiment, when a condition that the occurrence of an accident is settled is detected based on the image obtained through the camera, the processor may determine whether an accident has occurred, based on the image obtained through the camera (S1011).

According to an embodiment, even after it is determined that the occurrence of the accident is settled, based on the image obtained through the camera, the processor may determine whether an accident has occurred, based on the image obtained through the camera. For example, even after it is determined that the occurrence of the accident is settled, the processor may determine whether an accident has occurred, by monitoring an area around the vehicle through the CMS camera.

According to an embodiment, when it is determined that the occurrence of the accident is not settled, based on the image obtained through the camera, the processor may return to operation S1009 to output a warning and may restrict the driving of the vehicle and the operation of the vehicle door.

According to an embodiment, when it is determined that the accident situation is over, the processor may cancel the warning and may return an operation of the vehicle to a normal state (S1013).

According to an embodiment, when it is determined that the accident situation is over, based on the image obtained through the camera, the processor may stop outputting the warning.

According to an embodiment, when it is determined that the accident situation is over, based on the image obtained through the camera, the processor may allow the vehicle to move.

According to an embodiment, when it is determined that the accident situation is over, based on the image obtained through the camera, the processor may allow the powered door to be opened or closed.

Referring to FIG. 10, in a device and method for assisting a safe exit of a vehicle, according to an embodiment, when the vehicle door is a general door, the processor may detect a signal for requesting an operation associated with a dangerous situation (S1000).

According to an embodiment, when it is determined that a dangerous situation associated with the vehicle door has occurred, the processor may receive a signal for requesting an operation associated with the dangerous situation.

According to an embodiment, the processor may check (or identify) an angle of the CMS camera (S1021).

According to an embodiment, the processor may determine whether the CMS camera is positioned at an angle at which an image of the vehicle door is capable of being secured. In detail, the processor may determine whether the CMS camera is positioned at an angle at which the CMS camera is capable of capturing the image of the vehicle door.

According to an embodiment, the processor may move the camera to a predetermined angle (S1023).

According to an embodiment, when it is not determined that the CMS camera is located at an angle at which the CMS camera is capable of capturing an image of the vehicle door, the processor may move the camera at a predetermined angle such that the vehicle door is captured.

For example, a case that it is not determined that the CMS camera is located at an angle at which the CMS camera is capable of capturing an image of the vehicle door may include a case that the vehicle door is not captured because the camera is facing the outside of the vehicle.

According to an embodiment, the processor may determine whether an accident has occurred, based on the image obtained through the camera (S1025).

According to an embodiment, the processor may determine whether an accident related to the vehicle door has occurred, based on an image obtained through the camera. For example, the processor may determine whether an accident has occurred, by determining whether the entire vehicle door is identified in the side-view image of the vehicle.

According to an embodiment, when it is determined that an accident has not occurred, based on the image obtained through the camera, the processor may allow an operation of the vehicle (S1027).

According to an embodiment, when it is determined that an accident has not occurred, based on the image obtained through the camera, the processor may allow the vehicle to be driven (S1027).

According to an embodiment, when it is determined that the accident has occurred, based on the image obtained through the camera, the processor may output a warning and may restrict the operation of the vehicle (S1029).

According to an embodiment, when at least part of the vehicle door is not identified in the side-view image of the vehicle, the processor may determine that the accident has occurred.

According to an embodiment, when it is determined that the accident has occurred, based on the side-view image of the vehicle, the processor may output at least one of a warning sound or a warning message through an output device.

According to an embodiment, when it is determined that the accident has occurred, based on the side-view image of the vehicle, the processor may restrict the movement of the vehicle.

According to an embodiment, when a condition that the occurrence of an accident is settled is detected based on the image obtained through the camera, the processor may determine whether an accident has occurred, based on the image obtained through the camera (S1031).

According to an embodiment, even after it is determined that the occurrence of the accident is settled, based on the image obtained through the camera, the processor may determine whether an accident has occurred, based on the image obtained through the camera. For example, even after it is determined that the occurrence of the accident is settled, the processor may determine whether an accident has occurred, by monitoring an area around the vehicle through the CMS camera.

According to an embodiment, when it is determined that the accident has not been settled, based on the image obtained through the camera, the processor may return to operation S1029 to output a warning and may restrict the driving of the vehicle.

According to an embodiment, when it is determined that the accident situation is over, the processor may cancel the warning and may return an operation of the vehicle to a normal state (S1033).

According to an embodiment, when it is determined that the accident situation is over, based on the image obtained through the camera, the processor may stop outputting the warning.

According to an embodiment, when it is determined that the accident situation is over, based on the image obtained through the camera, the processor may allow the vehicle to move.

Figure 11:
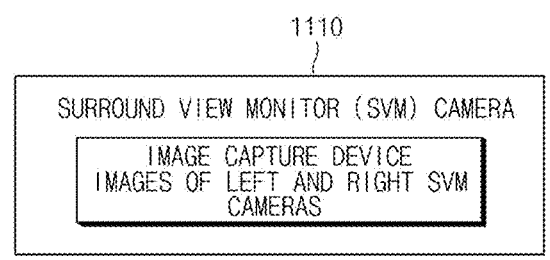
FIG. 11 illustrates a surround view monitor (SVM) camera used in a device and method for assisting a safe exit of a vehicle, according to an embodiment of the present disclosure.

FIG. 11 illustrates a surround view monitor (SVM) camera used in a device and method for assisting a safe exit of a vehicle, according to an embodiment of the present disclosure.

Detailed descriptions for determining whether a dangerous situation occurs, by using a SVM camera 1110 in FIG. 11 is replaced with descriptions for determining whether a dangerous situation occurs, by using a camera or CMS camera described above in FIGS. 1 to 10.

Referring to FIG. 11, in a device and method for assisting a safe exit of a vehicle according to an embodiment, a camera may be implemented as a front camera, a rear camera, a first blind-spot camera, and a second blind-spot camera that are provided in an SVM system.

According to an embodiment, the front camera may be mounted on the rear of a room mirror installed inside a vehicle to capture a front image of the vehicle, the rear camera may be mounted on the inside or outside rear of the vehicle to capture a rear image of the vehicle, the first blind-spot camera may be mounted on a left side mirror of the vehicle to capture a first blind-spot image of the vehicle, and the second blind-spot camera may be mounted on a right side mirror of the vehicle to capture a second blind-spot image of the vehicle.

According to an embodiment, the processor may obtain a side-view image of the vehicle through the SVM camera 1110.

According to an embodiment, the processor may determine whether a dangerous situation related to the door of the vehicle has occurred, based on the side-view image obtained through the SVM camera 1110.

According to an embodiment, the processor may control at least one of the vehicle's doors or the vehicle's operation in response to a determination that the dangerous situation has occurred, based on the side-view image obtained through the SVM camera 1110.

Figure 12:
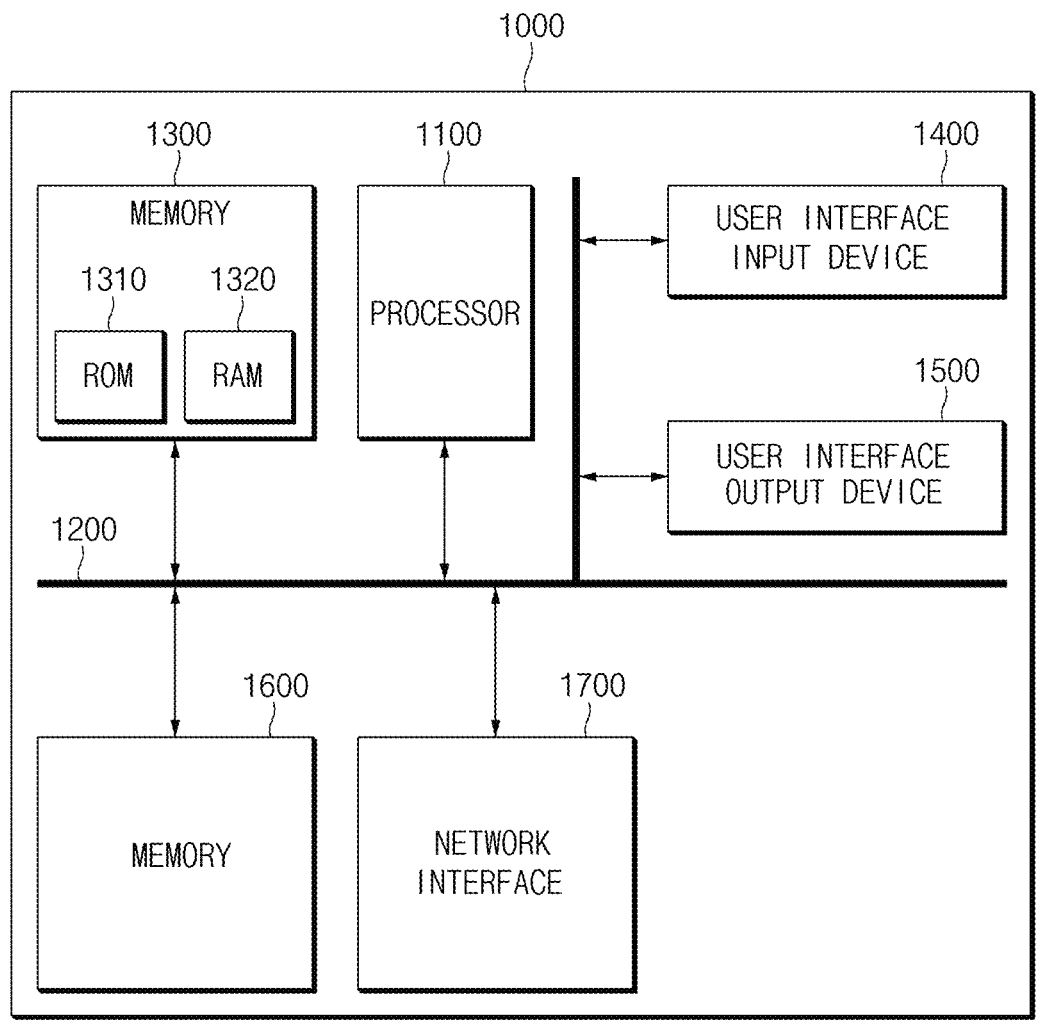
FIG. 12 illustrates a computing system related to a device and method for assisting a safe exit of a vehicle, according to an embodiment of the present disclosure.

FIG. 12 illustrates a computing system related to a device and method for assisting a safe exit of a vehicle, according to an embodiment of the present disclosure.

Referring to FIG. 12, a computing system 1000 related to the device and method for assisting a safe exit of a vehicle may include at least one processor 1100, a memory 1300, a user interface input device 1400, a user interface output device 1500, a memory (i.e., a storage) 1600, and a network interface 1700, which are connected with each other via a bus 1200.

The processor 1100 may be a central processing unit (CPU) or a semiconductor device that processes instructions stored in the memory 1300 and/or the memory 1600. Each of the memory 1300 and the memory 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the memory 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications may be made by one skilled in the art without departing from the essential characteristics of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

Descriptions of a safety exit assisting device of a vehicle according to an embodiment of the present disclosure, and a method thereof are as follows.

According to at least one of embodiments of the present disclosure, it is possible to prevent a safety accident, which is capable of occurring when a door is opened or closed, by using a CMS side camera outside the vehicle.

Furthermore, according to at least one of embodiments of the present disclosure, an existing camera may be used without attaching an additional sensor, and thus the device according to an embodiment of the present disclosure may be easily applied to vehicles.

Moreover, according to at least one of embodiments of the present disclosure, it is possible to secure the safety of a driver by outputting a warning sound and limiting vehicle operation even at powered doors and general doors.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A safety exit assisting device of a vehicle, the device comprising:
   a camera; and
   a processor electrically connected to the camera, wherein the processor is configured to:
   obtain a side-view image of the vehicle captured by the camera;
   determine whether a dangerous situation associated with a door of the vehicle occurs based on the side-view image, wherein the dangerous situation associated with the door includes a situation in which clothing or a finger is caught in the door; and
   control the door of the vehicle or an operation of the vehicle in response to a determination that the dangerous situation occurs.

2. The device of claim 1, wherein, when at least part of the door of the vehicle is not identified in the side-view image, the processor is configured to determine that the dangerous situation occurs.

3. The device of claim 1, further comprising a memory, wherein, when at least part of the door of the vehicle is not identified in the side-view image, the processor is configured to determine that the dangerous situation occurs based on a result of comparing the side-view image and a pre-stored side-view image, wherein the pre-stored side-view image is an image obtained while the vehicle is parked and stored in advance in the memory.

4. A safety exit assisting device of a vehicle having a powered door, the device comprising:
   a camera; and
   a processor electrically connected to the camera, wherein the processor is configured to:
   obtain a side-view image of the vehicle captured by the camera, the processor is configured to obtain the side-view image through the camera after adjusting an angle of the camera to a predetermined angle while the powered door is operated, and to change the angle of the camera to the angle before the adjustment in response to an operation of the powered door being completed;
   determine that a dangerous situation associated with the powered door occurs based on the side-view image; and
   control the powered door of the vehicle or an operation of the vehicle in response to determining that the dangerous situation occurs.

5. The device of claim 1, wherein, when the door of the vehicle is a rear powered door, when at least part of the rear powered door of the vehicle is not identified in the side-view image and a front door of the vehicle is open, the processor is configured to obtain a second side-view image through the camera after closing the front door and cause the rear powered door to be opened or closed in response to a determination that the dangerous situation does not occur based on the second side-view image.

6. The device of claim 1, wherein, when the door of the vehicle is a powered door, the processor is configured to determine whether the dangerous situation occurs based on the side-view image when a condition that the powered door is closed is satisfied and to close the powered door in response to a determination that the dangerous situation does not occur.

7. The device of claim 1, wherein, when the door of the vehicle is a powered door, the processor is configured to detect an object within a threshold distance from the powered door based on the side-view image when a condition that the powered door of the vehicle is opened is satisfied and to open the powered door until the object is detected.

8. The device of claim 1, wherein, when it is determined that there is an object connected to the vehicle in the side-view image, the processor is configured to determine whether the dangerous situation occurs based on a traveling direction of each of the object and the vehicle or a movement change amount of each of the object and the vehicle.

9. The device of claim 1, wherein, after it is determined that the dangerous situation occurs, the processor is configured to determine that the dangerous situation is settled in response to detecting a driver's gaze on a specific area, a specified voice command, a touch input, a specified door operation, or a shift gear change.

10. The device of claim 1, further comprising an output device, wherein, when it is determined that the dangerous situation occurs based on the side-view image, the processor is configured to output a warning message or a warning sound through the output device or to control the operation of the vehicle by restricting a movement of the vehicle.

11. The device of claim 1, wherein:
    the camera comprises a camera monitoring system camera or a surround view monitor camera; and
    the door of the vehicle comprises a ghost door, an electric power door, a sliding door, or a folding door.

12. A method for assisting a safe exit of a vehicle, the method comprising:
    obtaining a side-view image of the vehicle through a camera;
    determining whether a dangerous situation associated with a door of the vehicle occurs based on the side-view image, wherein the dangerous situation associated with the door includes a situation in which clothing or a finger is caught in the door; and
    controlling the door of the vehicle or an operation of the vehicle in response to a determination that the dangerous situation occurs.

13. The method of claim 12, wherein determining whether the dangerous situation occurs comprises determining that the dangerous situation occurs when at least part of the door of the vehicle is not identified in the side-view image.

14. The method of claim 12, wherein at least part of the door of the vehicle is not identified in the side-view image, wherein determining whether the dangerous situation occurs comprises determining that the dangerous situation occurs based on a result of comparing the side-view image and a pre-stored side-view image, and wherein the pre-stored side-view image is an image obtained while the vehicle is parked and stored in advance in a memory.

15. The method of claim 12, wherein the door of the vehicle is a powered door and wherein obtaining of the side-view image of the vehicle comprises:
    obtaining the side-view image through the camera after adjusting an angle of the camera to a predetermined angle while the powered door is operated; and
    changing the angle of the camera to the angle before the adjustment in response to a determination that an operation of the powered door is completed.

16. The method of claim 12, wherein the door of the vehicle is a rear powered door, wherein at least part of the rear powered door of the vehicle is not identified in the side-view image, wherein a front door of the vehicle is open, and wherein obtaining the side-view image of the vehicle comprises:
    obtaining a second side-view image through the camera after closing the front door; and in response to a determination that the dangerous situation does not occur based on the second side-view image, causing the rear powered door to be opened or closed.

17. The method of claim 12, wherein the door of the vehicle is a powered door and a condition that the powered door is closed is satisfied, and wherein determining whether the dangerous situation occurs comprises:

determining whether the dangerous situation occurs based on the side-view image; and closing the powered door in response to a determination that the dangerous situation does not occur.

18. The method of claim 12, wherein the door of the vehicle is a powered door, and wherein the method further comprises:

when a condition that the powered door of the vehicle is opened is satisfied, detecting an object within a threshold distance from the powered door based on the side-view image; and opening the powered door until the object is detected.

19. The method of claim 12, wherein it is determined that there is an object connected to the vehicle in the side-view image, and wherein determining whether the dangerous situation occurs comprises determining whether the dangerous situation occurs based on a traveling direction of each of the object and the vehicle or a movement change amount of each of the object and the vehicle.

20. The method of claim 12, wherein determining whether the dangerous situation occurs comprises determining that the dangerous situation occurs, the method further comprising determining that the dangerous situation is settled in response to detecting a driver's gaze on a specific area, a specified voice command, a touch input, a specified door operation, or a shift gear change.

* * * * *